United States Patent
Wang et al.

(10) Patent No.: US 11,982,633 B2
(45) Date of Patent: May 14, 2024

(54) METHOD FOR ANALYZING SIGNAL OF NEUTRAL ATOM IMAGING UNIT

(71) Applicant: Peking University, Beijing (CN)

(72) Inventors: Yongfu Wang, Beijing (CN); Qiugang Zong, Beijing (CN); Linghua Wang, Beijing (CN); Hongfei Chen, Beijing (CN); Hong Zou, Beijing (CN); Xiangqian Yu, Beijing (CN); Weihong Shi, Beijing (CN); Lyu Zhou, Beijing (CN)

(73) Assignee: Peking University, Beijing (CN)

( * ) Notice: Subject to any disclaimer, the term of this patent is extended or adjusted under 35 U.S.C. 154(b) by 755 days.

(21) Appl. No.: 17/092,334

(22) Filed: Nov. 9, 2020

(65) Prior Publication Data
US 2021/0215623 A1 Jul. 15, 2021

(30) Foreign Application Priority Data
Jan. 15, 2020 (CN) .......................... 202010042585.9

(51) Int. Cl.
*G01N 23/04* (2018.01)
(52) U.S. Cl.
CPC ......... *G01N 23/04* (2013.01); *G01N 2223/10* (2013.01); *G01N 2223/304* (2013.01)

(58) Field of Classification Search
None
See application file for complete search history.

(56) References Cited

FOREIGN PATENT DOCUMENTS

| CN | 106610501 A | * | 5/2017 |
| CN | 106610501 B | * | 1/2019 |
| CN | 109738933 A | * | 5/2019 |

* cited by examiner

*Primary Examiner* — Andrew Smyth
(74) *Attorney, Agent, or Firm* — IPRTOP LLC (57) ABSTRACT

The present disclosure provides a method for analyzing the signal of a neutral atom imaging unit, including: preparing a neutral atom imaging unit, which includes a semiconductor detector array and modulation grids disposed at intervals in front of the semiconductor detector array; preparing a neutral atom source plane, energetic neutral atoms emitted by the neutral atom source plane are received by the semiconductor detector array after passing through the modulation grids, and the modulation grids form a projection on the semiconductor detector array; obtaining a response function of the imaging unit according to the projection; calculating the data signal obtained by the neutral atom imaging unit; and performing inversion imaging on the neutral atom emission source according to the response function of the imaging unit and the data signal. The method well inverts the neutral atom emission source to obtain the intensity and size of the neutral atom emission source.

15 Claims, 7 Drawing Sheets

METHOD FOR ANALYZING SIGNAL OF NEUTRAL ATOM IMAGING UNIT

CROSS REFERENCE TO RELATED APPLICATION

This application claims the benefits of priority to Chinese Patent Application No. CN 2020100425859, entitled "Method for Analyzing Signal of Neutral Atom Imaging Unit", filed with CNIPA on Jan. 15, 2020, the contents of which are incorporated herein by reference in its entirety.

BACKGROUND

Field of Disclosure

The present disclosure relates to the field of neutral atom imaging, in particular, to a method for analyzing a signal of a neutral atom imaging unit.

Description of Related Arts

Holistic observation and global imaging have become one of the most promising approaches to solving geospatial physics issues. Energetic Neutral Atoms (ENA) are generated during the charge exchange process between ring current ions and geocorona hot particles. ENA is not bounded by magnetic fields and can leave the source area along a straight line at the speed of the initial energetic ion. Therefore, telemetry ENA imaging provides a new opportunity to distinguish the temporal and spatial changes of space plasma.

Traditional low-energy ENA detectors are generally made of channel multipliers, microchannel plates and diffraction filters. However, these ENA detectors are still seriously affected by ultraviolet radiation, and almost no scientifically valuable low-energy ENA detection results in near-earth space have been obtained.

The analysis of detection results of ENA detectors is also a technical problem. Therefore, what is needed is to provide an analysis method that can effectively analyze the detection results.

SUMMARY

The present disclosure provides a method for analyzing the signal of a neutral atom imaging unit. The method can accurately obtain the information of the neutral atom emission source according to the particle information detected by the detector.

The present disclosure provides a method for analyzing the signal of a neutral atom imaging unit, including:
preparing a neutral atom imaging unit, which includes a semiconductor detector array and modulation grids disposed at intervals in front of the semiconductor detector array;
preparing a neutral atom source plane, energetic neutral atoms emitted by the neutral atom source plane are received by the semiconductor detector array after passing through the modulation grids, and the modulation grids form a projection on the semiconductor detector array; obtaining a response function of the imaging unit according to the projection;
calculating the data signal obtained by the neutral atom imaging unit; and
imaging a neutral atom emission source according to the response function of the imaging unit and the data signal.

Optionally, the preparing of the neutral atom source plane further includes:
dividing the neutral atom source plane into 361 neutral atom sources from −90° to 90°, and using each neutral atom source as an angular neutral atom source;
denoting an angle between a neutral atom beam emitted by a j-th angular neutral atom source and received by the neutral atom imaging unit and a normal of the neutral atom source plane as e.

Optionally, the method further includes: treating the neutral atom beam emitted by the j-th angular neutral atom source and received by the neutral atom imaging unit as a parallel neutral atom beam.

Optionally, the obtaining of the response function of the imaging unit according to the projection further includes:
calculating a projection length of the modulation grids on the semiconductor detector array; and
normalizing the projection length.

Optionally, the calculating of the projection length of the modulation grids on the detector array further includes the following operations:
numbering the grid fringes of the modulation grids from left to right in order of 1, 2, . . . , i, . . . ;
calculating the projection length $l_{ij}$ of each grid fringe of the modulation grid on each semiconductor detector strip in the semiconductor detector array.

Optionally, the normalizing of the projection length further includes the following operations:
normalizing the projection length on the semiconductor detector strip using a width $w_{strip}$ of the semiconductor detector strip, to obtain a projection length matrix $M_{ij}=l_{ij} \cos(\theta_j)/w_{strip}$ of an i-th grid fringe on the semiconductor detector strip under an incidence of the neutral atom beam from the j-th angular neutral atom source;
obtaining a corresponding function $M=(M_{ij})$ of a detector/grid according to the projection length matrix.

Optionally, the method further includes:
performing Fast Fourier Transformation on each semiconductor detector in the semiconductor detector array.

Optionally, the calculating of the data signal obtained by the neutral atom imaging unit further includes:
performing straight-line tracking forward projection on the neutral atoms emitted from the neutral atom source plane;
calculating a probability graph $$m_{ij} = \frac{l_{ij}}{w_{strip}} \frac{1}{\cos(\theta_j)}$$

of particles from the neutral atom source plane detected by an i-th detector strip of the semiconductor detector array; and
randomly generating particles reaching the semiconductor detector array from the neutral atom emission source according to the probability graph.

Optionally, the imaging of the neutral atom emission source according to the response function of the imaging unit and the data signal further includes:
using a matrix m to obtain a probability graph of the neutral atom source plane for each particle reaching the i-th detector strip; and summing probabilities of all particles detected by the semiconductor detector array, to obtain a source distribution of a back projection, the matrix m is a probability matrix used for the back projection, and m=($m_{ij}$).

Optionally, the calculating of the data signal obtained by the neutral atom imaging unit further includes: obtaining a number of the particles detected by each detector strip by using a Geant4 simulation method.

Optionally, the imaging of the neutral atom emission source according to the response function of the imaging unit and the data signal further includes: summing probability graphs of all particles detected by the semiconductor detector array, to obtain the source distribution of the back projection.

Optionally, a number of detector strips in the semiconductor detector array is 256, a width of the detector strip ranges from 0.1 mm to 0.4 mm, a length of the detector strip ranges from 20 mm to 25 mm, and a spacing between adjacent detector strips ranges from 0.02 mm to 0.05 mm.

Optionally, a number of detector strips in the semiconductor detector array is 256, a width of the detector strip is 0.4 mm, a length of the detector strip is 20 mm, and a spacing between adjacent detector strips is 0.05 mm.

Optionally, a fringe spacing of the modulation grids increases or decreases within a range of 0.9 mm to 7.2 mm to form a periodic arrangement, and the modulation grids include two fringe periods.

Optionally, the spacing between the semiconductor detector array and the modulation grid ranges from 10 mm to 15 mm.

As mentioned above, the method for analyzing the signal of a neutral atom imaging unit according to the present disclosure has the following technical effects: the neutral atom emission source can be well inverted according to the neutral atom information (such as the number of neutral atoms) obtained by the detector, so as to image the neutral atom emission source and obtain the intensity and size of the neutral atom emission source. The above method of the present disclosure is easy to perform, and the inversion result is accurate.

BRIEF DESCRIPTION OF THE DRAWINGS

The features and advantages of the present disclosure will be more clearly understood by referring to the drawings. The drawings are merely schematic representations and shall not be interpreted as limiting the present disclosure. In the drawings.

DESCRIPTION OF REFERENCE NUMERALS

100 Neutral atom imaging unit
101 Modulation grid
102 Semiconductor detector array
200 Neutral atom source plane
201 First angular neutral atom source
2010 Neutral atom beam emitted by the first angular neutral atom source
202 i-th angular neutral atom source
2020 Neutral atom emitted by the i-th angular neutral atom source

DETAILED DESCRIPTION OF THE PREFERRED EMBODIMENTS

In order to make the objectives, technical solutions and advantages of embodiments of the present disclosure clearer, the technical solutions in the embodiments of the present disclosure will be described clearly and completely below with reference to the drawings. The described embodiments are only a part of the embodiments of the present disclosure, instead of all embodiments of the present disclosure. Based on the embodiments in the present disclosure, all other embodiments obtained by a person skilled in the art fall within the protection scope of the present disclosure.

Embodiment 1

Figure 1:
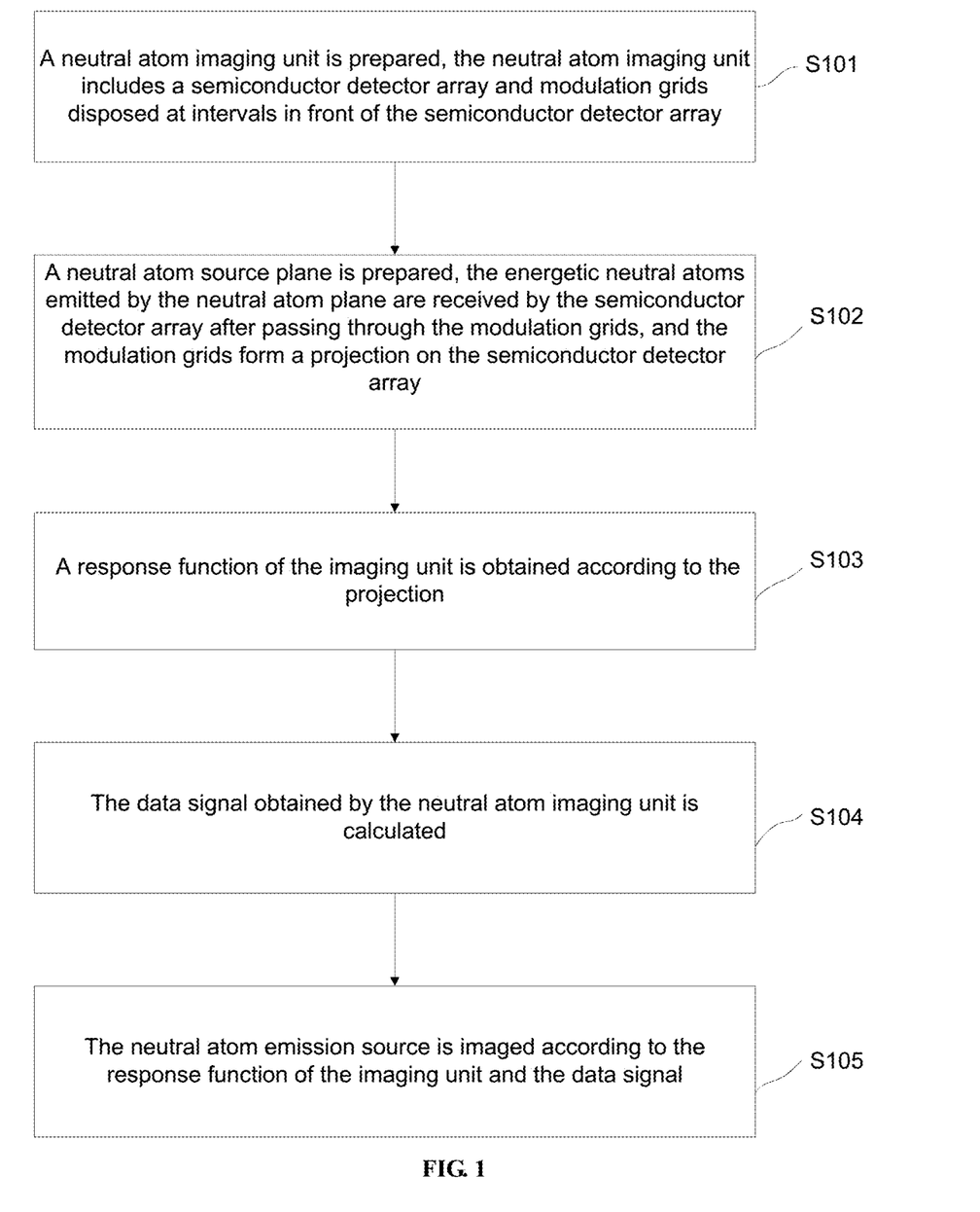
FIG. 1 shows a schematic flowchart of a method for analyzing a signal of a neutral atom imaging unit according to the present disclosure.

This embodiment provides a method for analyzing a signal of a neutral atom imaging unit. As shown in FIG. 1, the method includes the following operations:

S101: a neutral atom imaging unit is prepared, the neutral atom imaging unit includes a semiconductor detector array and modulation grids disposed at intervals in front of the semiconductor detector array.

Figure 2:
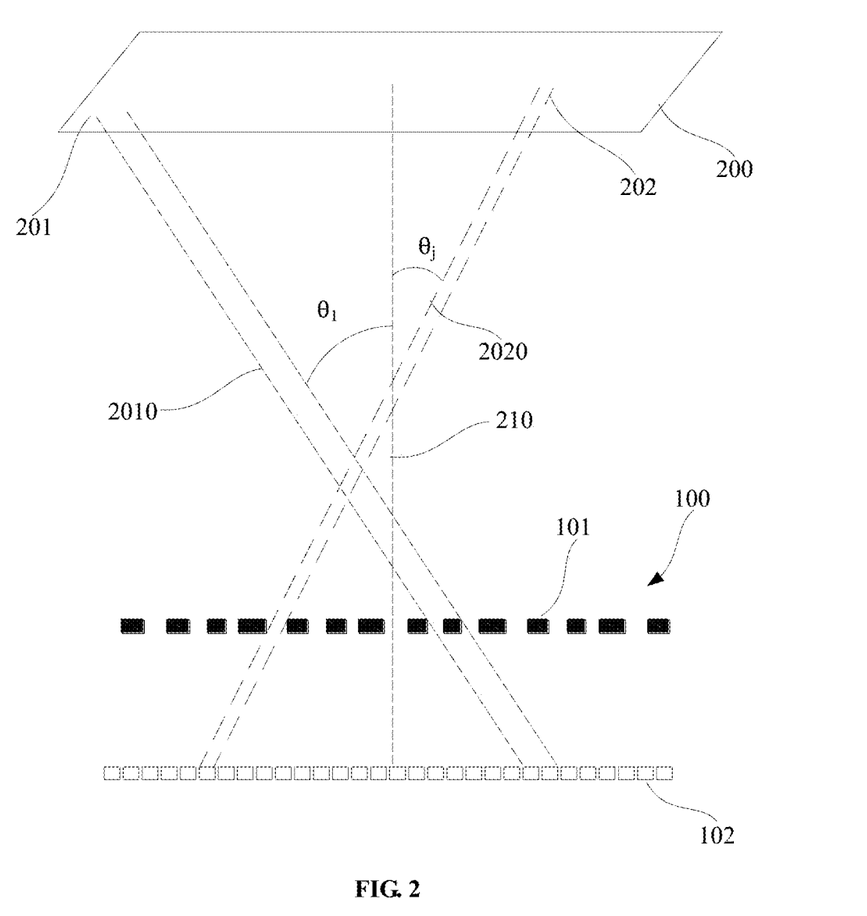
FIG. 2 shows a simulation diagram of an imaging process of the neutral atom imaging unit.
Figure 3:
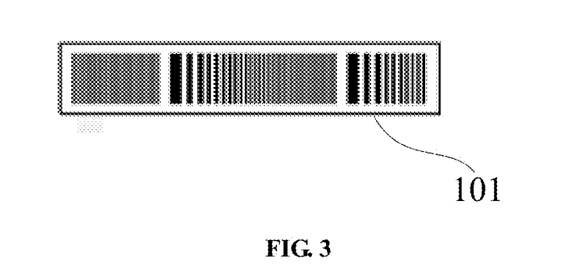
FIG. 3 is a schematic diagram showing the modulation grid of FIG. 1.

FIG. 2 schematically shows a simulation diagram of the imaging process of the neutral atom imaging unit. The neutral atom imaging unit 100 includes a modulation grid 101 and a semiconductor detector array 102 arranged behind the modulation grid. FIG. 3 shows a schematic diagram of the modulation grid. The modulation grid 101 forms slits by a plurality of slats, i.e., grid fringes. Specifically, the specific parameters of the modulation grid 101 are shown in Table 1 below. The semiconductor detector array 102 includes a plurality of semiconductor detector strips. The specific parameters of the semiconductor detector array in the present disclosure are shown in Table 1 below. As shown in FIG. 3, a spacing between the plurality of grid fringes increases from 0.9 mm to 7.2 mm, and the grid fringes are arranged periodically. As shown in FIG. 3, the modulation grid 101 of the present disclosure includes two grid fringe periods. The grid fringes are numbered from left to right in order of 1, 2, 3, . . . ,

TABLE 1

| Parameter list of modulation grid and semiconductor detector array | | |
|---|---|---|
| Grid | Length (outside) | 127.22 mm |
| | Length (inside) | 115.22 mm |
| | Width (outside) | 35 mm |
| | Width (inside) | 25 mm |

TABLE 1-continued

| Parameter list of modulation grid and semiconductor detector array | | |
|---|---|---|
| | Number of periods | 2 |
| | Fringe spacing | 7.2-0.9 mm (8 groups evenly spaced) |
| | Thickness | 0.4, 0.3, 0.2, 0.1, 0.0 mm |
| Grid-detector spacing | | 10.4 mm |
| Detector | Number of strips | 256 |
| | Width of strips | 0.40 mm |
| | Length of strips | 20 mm |
| | Strip spacing | 0.05 mm |

S102: a neutral atom source plane is prepared, the energetic neutral atoms emitted by the neutral atom plane are received by the semiconductor detector array after passing through the modulation grids, and the modulation grids form a projection on the semiconductor detector array.

S103: a response function of the imaging unit is obtained according to the projection.

To calculate the detector/grid response function, in this embodiment, the neutral atom source plane is divided into 361 parts from −90° to 90°, and the angular width of each part is 0.5°. For each neutral atom source angle j, the angle between the neutral atom beam emitted by the j-th angular neutral atom light source and received by the neutral atom imaging unit and the normal of the neutral atom light source plane is denoted as $\theta_j$. The neutral atom beams emitted from the same neutral atom source are considered as parallel neutral atom beams. Then, the projection length of each grid fringe i on each detector strip is calculated. The observation area of the neutral atom source of the angle of j is equal to the projection length $l_{ij}$ multiplied by $\cos(\theta_j)$ (equivalent area) and normalized by the detector strip width $w_{strip}$:

$$M_{ij} = l_{ij} \cos(\theta_j)/w_{strip} \quad (1)$$

The matrix $M=(M_{ij})$ a gives the detector/grid response function. Formally, regarding the source S, detector response may be obtained according to D=M·S, S is the neutral atom intensity corresponding to the 361 angular divisions of the source plane, and is a vector. M is the response function matrix. D is the number of neutral atoms that the detector detects.

In a preferred embodiment, the properties of the above response function in spatial frequency are further studied. To study the properties of the response function in spatial frequency, in the present disclosure, the following equation (2) of Hurford et al. (2002) is simulated:

$$A(\Phi)=T(1+a_1 \cos(\Phi-\Psi_1)+a_2 \cos(2(\Phi-\Psi_2))+L+a_i \cos(3(\Phi-\Psi_i))+ \ldots ) \quad (2)$$

The equation (2) is the expression of the corresponding function of the entire system at different spatial frequencies, i.e., the mathematical description of the spatial Fourier transform operation on the response function. $a_i$ is the amplitude corresponding to different frequencies, $\phi$ represents the spatial angle, and $\psi i$ is the phase corresponding to different frequencies.

For each detector, Fast Fourier Transformation (FFT) is performed on each row. The space period is kept at less than ten times (i.e., 25°) of the highest angular resolution (2.5°).

In this embodiment, the grid thickness is 0.2 mm. The neutral atom imaging unit with the length of the semiconductor detector shorter than the inside length of the grid by 0.02 mm performs the calculation of the response function.

Figure 4A:
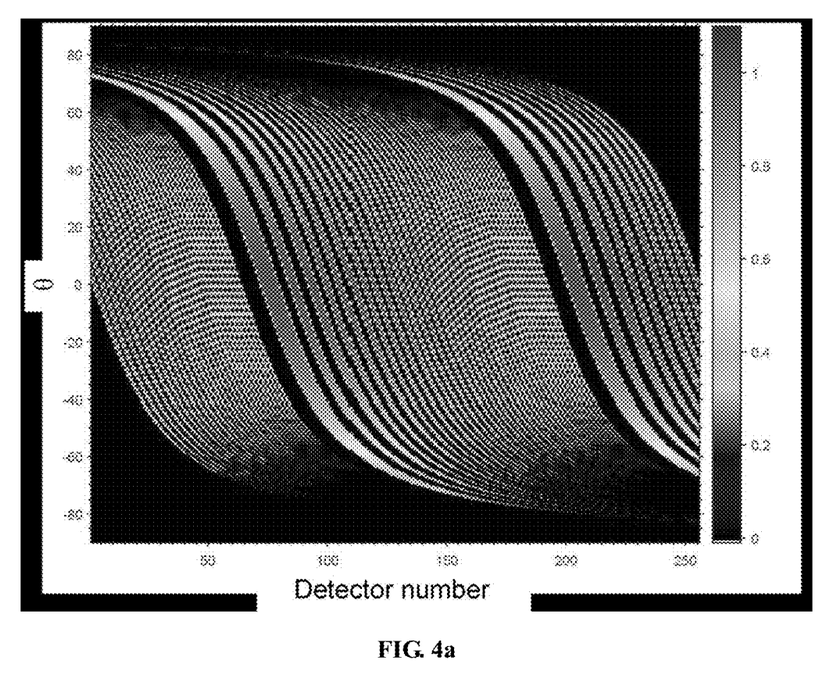
FIGS. 4a and 4b show response functions of physical space (left) and frequency space (right) corresponding to calculating example 1.
Figure 4B:
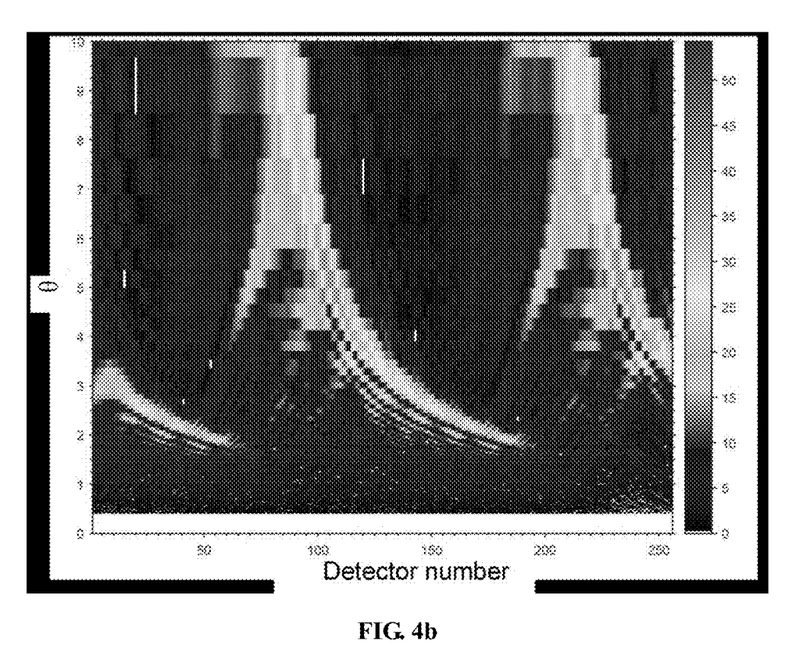

As shown in FIGS. 4a and 4b, the two groups of grid periods are completely covered by the detector, and the space period from angular resolution to tens of angular resolution can be well recorded by different detector strips.

S104: the data signal obtained by the neutral atom imaging unit is calculated.

S105: the neutral atom emission source is imaged according to the response function of the imaging unit and the data signal observed by the neutral atom imaging unit.

In a preferred embodiment, a straight-line tracking method is used to obtain the data signal of the neutral atom imaging unit. In this preferred embodiment, the neutral atom emission source plane is divided from −30° into 30 and 25 small grids, and the angular width of each grid is 2.5°. For each angular source j, 10 million particles that are uniformly distributed are randomly arranged on the top plane of the grid, and each particle orbit is tracked as a straight line to the detector plane. If a particle reaches the i-th detector strip, the (i, j) element of the matrix $\overset{\%}{M}$ is increased by 1, and then the detector response of the specified source S may be calculated by using $D=\overset{\%}{M} S$. Then, the detector response is normalized to 1, so as to obtain the probability of particles reaching each detector strip, as shown in the following equation:

$$m_{ij} = \frac{l_{ij}}{w_{strip}} \frac{1}{\cos(\theta_j)}, \quad (1)$$

$m=(m_{ij})$ is the probability matrix used for back projection.

For back projection, particles reaching a certain strip of the semiconductor detector from the neutral atom emission source (as an unknown source for testing) are randomly generated according to the probability graph. For each particle reaching a certain strip, a matrix m may be used to obtain a probability graph of the source plane. In this embodiment, the source distribution of the back projection is obtained by considering different counts (1, 3, 10, 30, 100, 1000, 5000, 10000, 50000) and summing the probability graphs of all detected particles. The graphs in the simulation results are normalized by the sum of the back-projection source distributions, so as to compare the results in different situations.

In another preferred embodiment, Geant4 is used to simulate the detector/grid response. In this case, it is supposed that the particle type is H atom of 20 keV, and different incidence angles are taken into account. One million particles are used per run. The number of particles received by each detector strip is directly used for back projection calculation. The number of particles detected by each detector strip is directly used to calculate the probability sum of all detected particles, to obtain the source distribution of the back projection. The graphs in the simulation results are normalized by the sum of the projection source distributions.

Figure 5A:
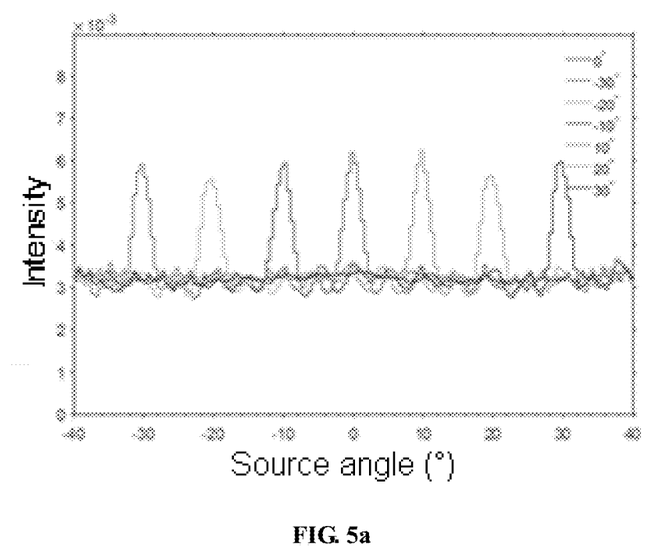
FIGS. 5a and 5b show back projection results of seven point sources of different angles (left) and point sources of different angles (right) according to calculating example 1.
Figure 5B:
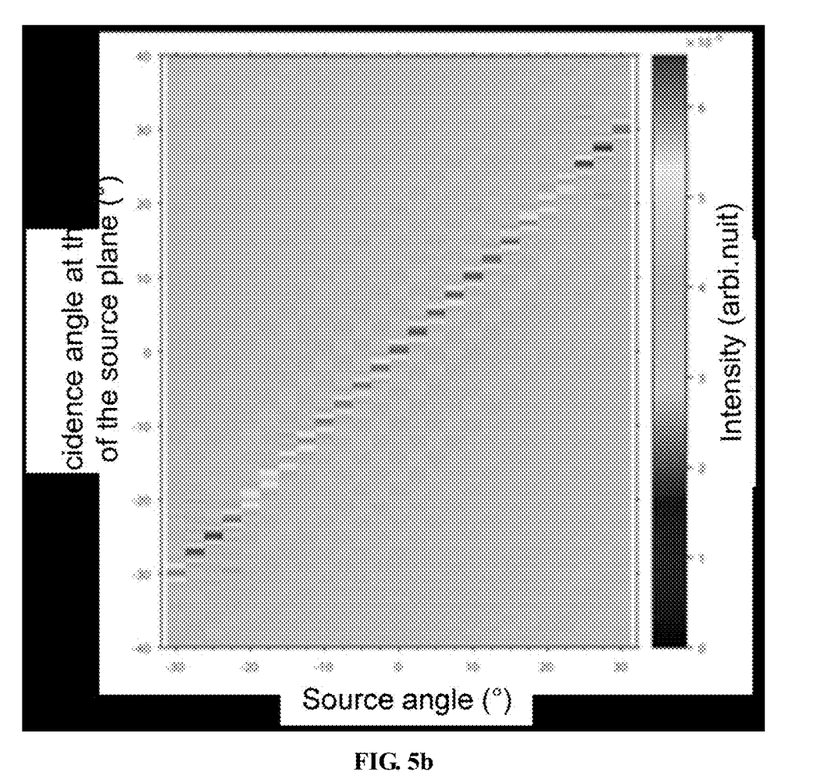
Figure 6:
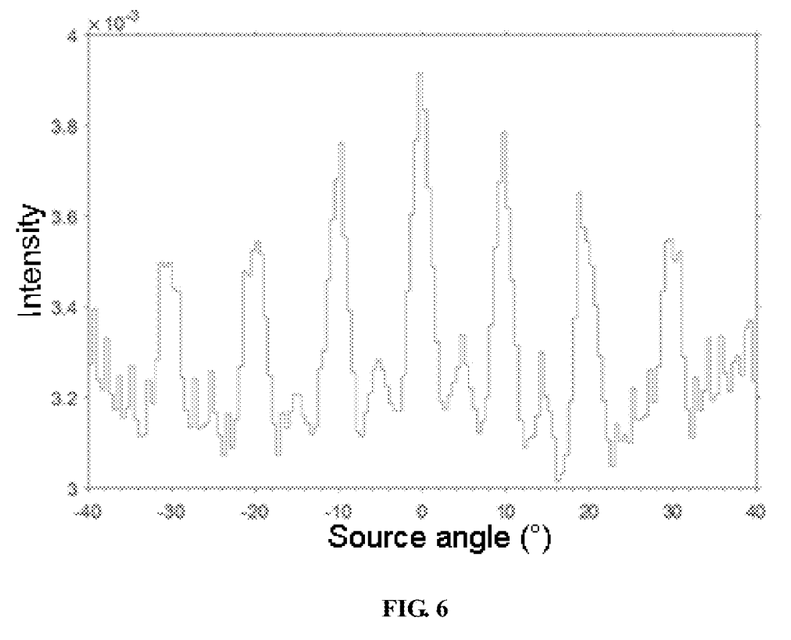
FIG. 6 shows the back projection result of seven point sources according to calculating example
Figure 7:
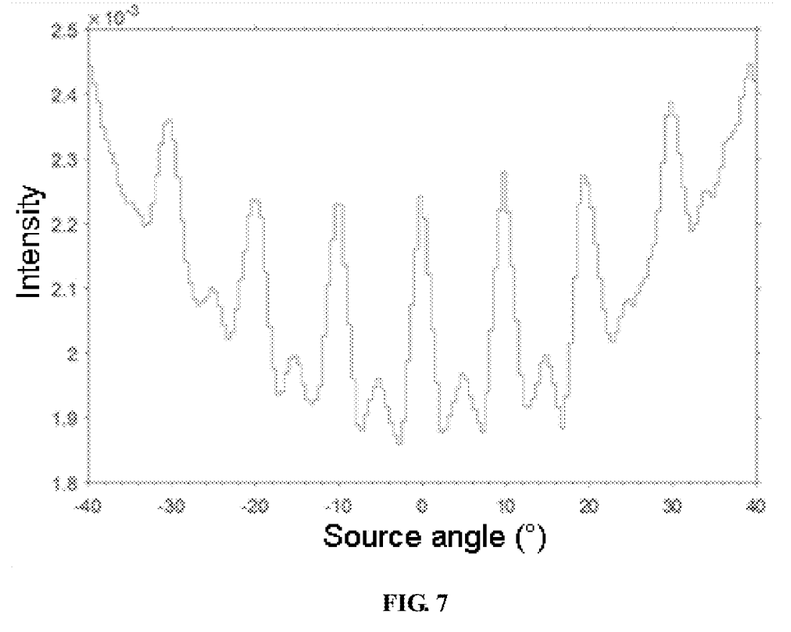
FIG. 7 shows the back projection result of the seven point sources when the grid thickness is 0.0 mm (in an ideal case).

FIGS. 5a and 5b show the back projection results of point sources at the center and different angles. The point source has a spatial distribution of the imager angular resolution (2.5°). It can be seen that the source can be well reconstructed, and the intensity of the side lobe is negligible compared with that of the main lobe. FIG. 6 shows the back projection results of 7 point sources (−30°, −20°, −10°, 0°, 10°, 20°, 30°), which illustrates that the seven sources can be well separated. FIG. 7 shows the inversion result of the seven point sources when the grid thickness is 0.0 mm (in an ideal case). As can be seen from the figure, within the field of view)(±22.5°, the intensities of the seven point sources are basically the same, which can be well obtained by inversion.

Figure 8A:
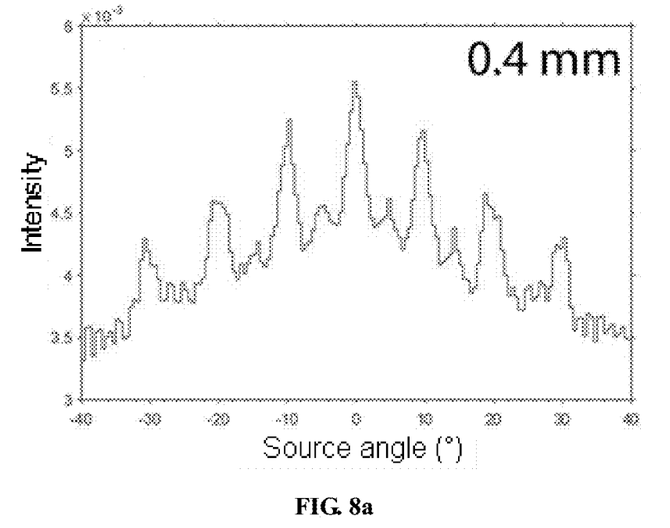
FIGS. 8a to 8d show the back projection results of the seven point sources when the grid thickness is 0.4 mm, 0.3 mm, 0.2 mm and 0.1 mm, respectively.
Figure 8B:
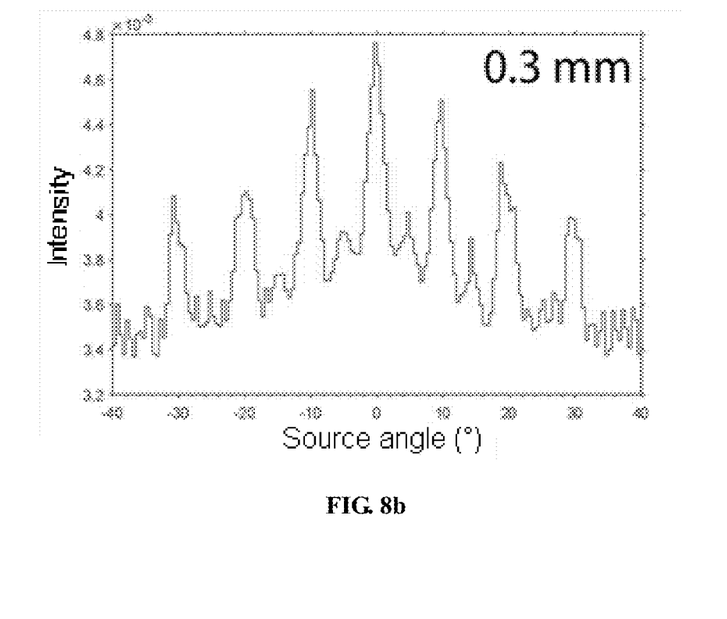
Figure 8C:
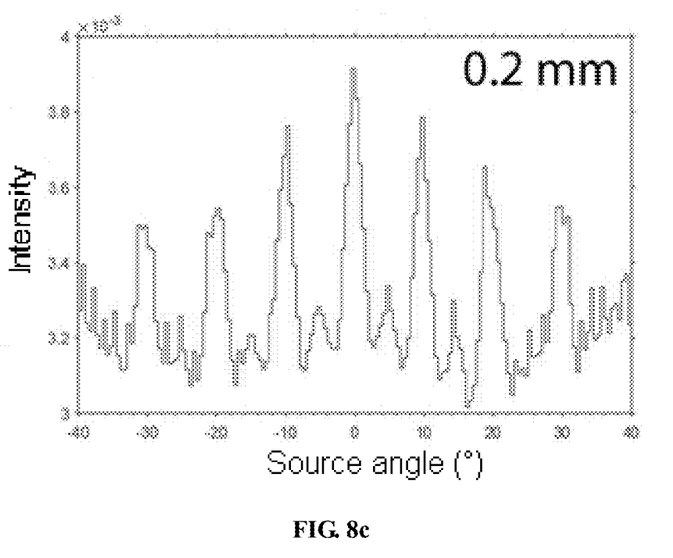
Figure 8D:
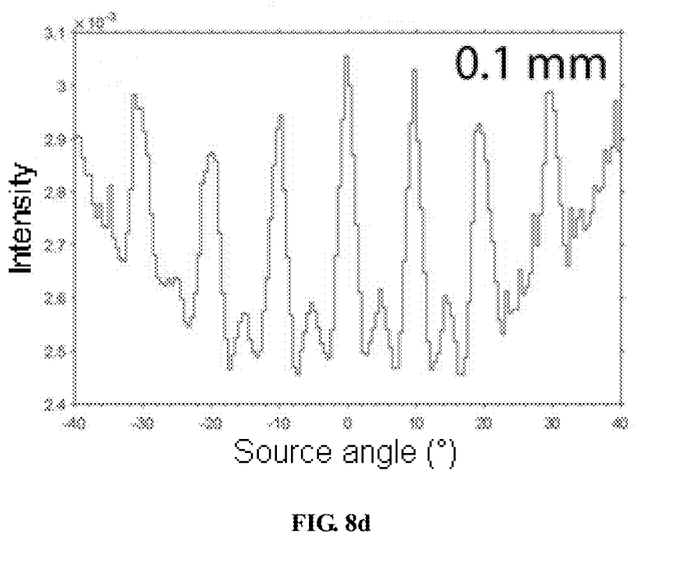

In a preferred embodiment, the influence of the grid thickness on the inversion result is further considered. The inversions are carried out on the neutral atom imaging units containing modulation grids of different thicknesses. For example, in this preferred embodiment, inversion calculations are performed on neutral atom imaging units with grid thicknesses of 0.0 mm (in an ideal case), 0.4 mm, 0.3 mm, 0.2 mm, and 0.1 mm, and the results are shown in FIGS. 8a to 8b. It can be seen from the figure that 0.1 mm (good) or 0.2 mm (relatively poor effect) is a reasonable grid thickness choice.

The above-mentioned embodiments are just used for exemplarily describing the principle and effects of the present disclosure instead of limiting the present disclosure. Various changes and variations may be made by the skilled in the art without departing the spirit and scope of the present disclosure. The above changes and variations fall within the scope as specified by the appended claims.

What is claimed is:

1. A method for analyzing a signal of a neutral atom imaging unit, comprising:
   preparing a neutral atom imaging unit, which includes a semiconductor detector array and modulation grids disposed at intervals in front of the semiconductor detector array;
   preparing a neutral atom source plane, energetic neutral atoms emitted by the neutral atom source plane are received by the semiconductor detector array after passing through the modulation grids, and the modulation grids form a projection on the semiconductor detector array;
   obtaining a detector response function according to the projection;
   calculating a data signal obtained by the neutral atom imaging unit; and
   imaging a neutral atom emission source according to the detector response function and the data signal.

2. The method for analyzing a signal of a neutral atom imaging unit according to claim 1, wherein the preparing of the neutral atom source plane further comprises:
   dividing the neutral atom source plane into 361 neutral atom sources from −90° to 90°, and using each neutral atom source as an angular neutral atom source;
   denoting an angle between a neutral atom beam emitted by a j-th angular neutral atom source and received by the neutral atom imaging unit and a normal of the neutral atom source plane as $\theta_j$.

3. The method for analyzing a signal of a neutral atom imaging unit according to claim 2, further comprising: treating the neutral atom beam emitted by the j-th angular neutral atom source and received by the neutral atom imaging unit as a parallel neutral atom beam.

4. The method for analyzing a signal of a neutral atom imaging unit according to claim 2, wherein the obtaining of the detector response function according to the projection further comprises:
   calculating a projection length of the modulation grids on the semiconductor detector array; and
   normalizing the projection length.

5. The method for analyzing a signal of a neutral atom imaging unit according to claim 4, wherein the calculating of the projection length of the modulation grids on the semiconductor detector array further comprises:
   numbering grid fringes of the modulation grids from left to right in order of 1, 2, . . . , calculating the projection length $l_{ij}$ of each grid fringe of the modulation grid on each semiconductor detector strip in the semiconductor detector array.

6. The method for analyzing a signal of a neutral atom imaging unit according to claim 5, wherein the normalizing of the projection length further comprises:
   normalizing the projection length on the semiconductor detector strip using a width $w_{strip}$ of the semiconductor detector strip, to obtain a projection length matrix $M_{ij}=l_{ij}\cos(\theta_j)/w_{strip}$ of an i-th grid fringe on the semiconductor detector strip under an incidence of the neutral atom beam from the j-th angular neutral atom source;
   obtaining a corresponding function $M=(M_{ij})$ of a detector/grid according to the projection length matrix.

7. The method for analyzing a signal of a neutral atom imaging unit according to claim 1, further comprising:
   performing Fast Fourier Transformation on each semiconductor detector in the semiconductor detector array.

8. The method for analyzing a signal of a neutral atom imaging unit according to claim 6, wherein the calculating of the data signal obtained by the neutral atom imaging unit further comprises:
   performing straight-line tracking forward projection on the neutral atoms emitted from the neutral atom source plane;
   calculating a probability graph $$m_{ij} = \frac{l_{ij}}{w_{strip}} \frac{1}{\cos(\theta_j)}$$

of particles from the neutral atom source plane detected by an i-th detector strip of the semiconductor detector array; and
   randomly generating particles reaching the semiconductor detector array from the neutral atom emission source according to the probability graph.

9. The method for analyzing a signal of a neutral atom imaging unit according to claim 8, wherein the imaging of the neutral atom emission source according to the detector response function and the data signal further comprises:
   obtaining a probability graph of the neutral atom emission source by using a matrix m for all particles reaching the i-th semiconductor detector strip;
   summing probabilities of all particles detected by the semiconductor detector array, to obtain a neutral atom emission source distribution of a back projection, the matrix m is a probability matrix used for the back projection, and $m=(m_{ij})$.

10. The method for analyzing a signal of a neutral atom imaging unit according to claim 1, wherein the calculating of the data signal obtained by the neutral atom imaging unit further comprises: obtaining a number of the particles detected by each semiconductor detector strip by using a Geant4 simulation method.

11. The method for analyzing a signal of a neutral atom imaging unit according to claim 10, wherein the imaging of the neutral atom emission source according to the detector response function and the data signal further comprises: summing probability graphs of all particles detected by the semiconductor detector array, to obtain a source distribution of the back projection.

12. The method for analyzing a signal of a neutral atom imaging unit according to claim 1, wherein a number of detector strips in the semiconductor detector array is 256, a width of the detector strip ranges from 0.1 mm to 0.4 mm, a length of the detector strip ranges from 20 mm to 25 mm, and a spacing between adjacent detector strips ranges from 0.02 mm to 0.05 mm.

13. The method for analyzing a signal of a neutral atom imaging unit according to claim 1, wherein a number of detector strips in the semiconductor detector array is 256, a width of the detector strip is 0.4 mm, a length of the detector strip is 20 mm, and a spacing between adjacent detector strips is 0.05 mm.

14. The method for analyzing a signal of a neutral atom imaging unit according to claim 1, wherein a fringe spacing of the modulation grids increases or decreases within a range of 0.9 mm to 7.2 mm to form a periodic arrangement, and the modulation grids includes 2 to 8 fringe periods.

15. The method for analyzing a signal of a neutral atom imaging unit according to claim 1, wherein a spacing between the semiconductor detector array and the modulation grids ranges from 10 mm to 15 mm.

* * * * *